May 26, 1936.  J. V. MOHLER  2,042,159
AUTOMATIC PARACHUTE RELEASE DEVICE
Filed Sept. 20, 1935
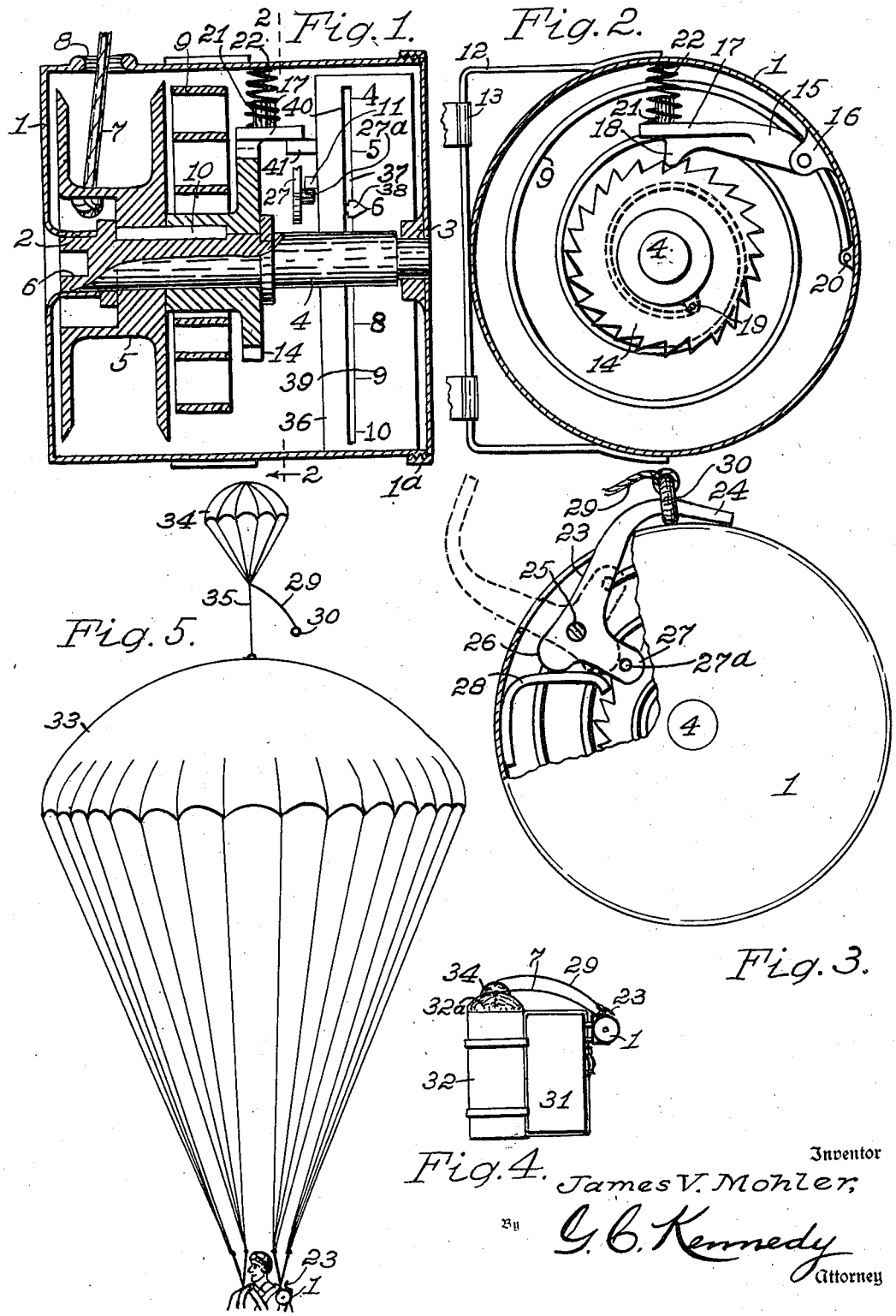
Inventor
James V. Mohler,
By G. C. Kennedy
Attorney Patented May 26, 1936

2,042,159

UNITED STATES PATENT OFFICE 2,042,159

AUTOMATIC PARACHUTE RELEASE DEVICE

James V. Mohler, Oelwein, Iowa, assignor of one-half to Guy M. Butts, Wesley, Iowa Application September 20, 1935, Serial No. 41,389

5 Claims. (Cl. 244—21)

My invention relates to improvements in automatic parachute releasing devices, and an object of my improvements is to supply means for automatically releasing, after launching, a main parachute from its openable closed container at a predetermined time and including a pilot parachute for assisting in dragging the main parachute from its container when released therefrom by said means.

Another object of my improvements is to provide disconnectible connecting means between the pilot parachute and said releasing means for the main parachute, aside from other connecting means between said parachutes, and to start the timer for the releasing means.

It is to be noted that various modifications in the details of construction and arrangement of parts of said apparatus and connections may be made without departure from the principles and scope of my invention as defined in the appended claims.

I have attained the above objects by the apparatus which is hereinafter described and claimed, and which is illustrated in the accompanying drawing, in which Fig. 1 is a central longitudinal section of the casing and inclosed mechanism of my apparatus which includes means for releasing the main parachute from its openable closed container at a predetermined time interval after launching. Fig. 2 is a transverse section of the same taken on the broken line 2—2 of Fig. 1. Fig. 3 is an end view of the casing for said mechanism partially broken away to display the swingable catch device and its releasable connection to a flexible member secured to the pilot parachute. Fig. 4 is a side elevation on a smaller scale of a container for the main parachute as secured to a loading on which is mounted the mechanism for causing the rip cord to release the fastenings of the container to release said parachute, and Fig. 5 is an elevation of the main and pilot parachutes as fully expanded after the release of the same after launching while carrying a passenger.

I am aware that other apparatus has been presented operable to release a passenger carrying parachute after launching, at a predetermined time, but my apparatus for this purpose is designed for more certain and effective operation than those shown in the prior art, which is of vital importance for the successful performance of this function.

Referring first to said Fig. 5, this figure exhibits fully expanded main and pilot parachutes, having a flexible connection, and shown as fully expanded after launching according to my invention with the pilot parachute disconnected from the mechanism carried by a passenger and after an actuation of the mechanism for releasing the main parachute from its container also carried by the passenger.

In said Fig. 4 the main parachute is housed in collapsed condition in its container, with the collapsed pilot parachute resting upon the container, with connections between the releasing mechanism for the container and main parachute, and the pilot parachute, respectively.

In Figs. 1 to 3 inclusive are shown in approximately full size the casing with included releasing mechanism, and in Fig. 3 an elevation of a catch device for ligation disconnectedly to the pilot parachute, the catch device being shown closed and connected to the ligation in full lines, while the dotted lines display the fully opened position of the catch device after disconnection from the ligation with the pilot parachute.

The casing 1 is cylindrical but may be of any desired other shape, having end heads provided with entrant hollow bearings 2 and 3 to seat therein the opposite ends of a rotatable shaft 4. A sheave 5 and a ratchet wheel 14 are removably fixed upon said shaft by a spline 10. Intermediate said sheave and ratchet wheel a strong spiral spring 9 has its opposite ends anchored respectively to the hub of the ratchet wheel and to the casing 1, as best shown in Fig. 2. The numeral 7 denotes a rip cord having one end secured to the hub part of the sheave 5 and, as shown in Fig. 4, has its other end secured to separable fastening means, not particularly shown, for the openable closure top part 32a of the container 32, within which is the collapsed main parachute 33, such fastening means, however, being well known in this art.

The casing 1 has a removable end cap 1a, and also has a rimmed port 8 traversed by said rip cord 7. As shown in Fig. 2, a pawl 15 is pivoted to a boss 16 within the casing 1 and its detent 18 engages teeth of the ratchet wheel 14. This pawl has a side shelf 17 carrying a stud 21 within a short helical spring 22 engaged endwise between the casing and said shelf, and tending to retain the pawl in engagement with teeth of the ratchet wheel. The free end of the pawl 17 may be raised to disengage from the ratchet wheel by any desired actuating part or element of a timing device, such as shown at 36 adjacent the ratchet wheel 14. This element 41 is to be actuated to push upon and lift the pawl out of engagement with the ratchet wheel at a predetermined time, and the mechanism of the casing or box 36 arranged for being set for actuation at various time steps, such as for 4 to 10 or more seconds of time elapsing from the launching of the main parachute 32 to the actuation of the element 41 to release the pawl 15. The box containing the timing means may be slotted at 40 and an index member 38 protruded therethrough, and which member may also be used in a resetting of the timer 36. The timer box may have second intervals indicated upon it as at 39, and also is provided with a starting part or arm 11.

In said Fig. 3 is shown a catch device 23 pivoted near one end within the casing 1 on a stud shaft 25, and has a curvate hooked catch finger 24 which extends outwardly through a circumferential slot in the casing. The short end part of this catch device has two rounded bosses of different lengths and spaced apart about ninety degrees from each other for alternate engagements with an inwardly branched or hooked plate spring 28 fastened on the inner wall of the casing 1 to respectively releasably hold the catch in either of two positions, closed as in full lines in Fig. 3, or opened fully as in dotted lines in the same figure. The catch 27 has a stud 27a to shift a timer part to start it at 11. The numeral 29 denotes a flexible cord having one end supplied with a ring 30 which may be slipped over the bent finger 24, with the other end of the cord, as shown in Fig. 5, connected to the convergent lower ends of the cords depending from the pilot parachute 34, where the ligating cord 35 connects the pilot to the main parachute.

The timer 36 having been set by the coacting elements 27 and 11 for instance at a time interval of six seconds to elapse from the time of launching until the actuation of the releasing mechanism in the casing 1, in order to clear the airplane safely, the pack 32 containing the main parachute 33 and superposed exposed and collapsed pilot parachute 34, and as secured to a loading 31 or upon a passenger as shown in Fig. 5, becomes automatically released or opened at its upper part to release the main parachute by a strong pull upon the fastening means of the container by the rip cord 7 actuated by the mechanism within the casing 1, at the expiration of said six seconds of elapsed time. This is due to the timer element 41 at the end of six seconds being moved up with the pawl 15 while compressing the helical spring 22, disengaging the ratchet wheel from the pawl. It will be understood that before a launching of the apparatus, the spiral spring 9 has been wound up by a box-end crank not shown, and which at the same time has unwound the rip cord 7 on the reel 5.

When the ratchet wheel 14 is released from the pawl 15, the spring 9 at once unwinds with sufficient power to reel up the rip cord 7 upon the sheave or reel 5, and the rip cord opens the releasable fastening means for the container 32—32a, thus permitting the strong suction upon the main parachute from above due to its falling rapidly to withdraw the parachute from the container.

Previously, however, the pilot parachute from about the beginning of the launching becomes inflated and exerts a drag upon the main parachute when released, which aids in removing the main parachute from the container, so that the ligated parachutes descend as shown in Fig. 5, buoyed by the atmosphere in the usual way.

The cap 1a of the casing may be removed to permit removal of the timer 36 for a resetting.

The cord 29 is concurrently tensioned by the pilot parachute 34 and its ring 30 swings the catch-arm 24 to a position as shown by the dotted lines in Fig. 2, disconnecting the casing from the pilot parachute, and starting the timer 36. When connected as in Fig. 3, the cord 29 remains linked to the closed arm 24 as in Fig. 4, for convenience in the assemblage when not in use.

I claim:

1. In combination, a collapsible main parachute and a collapsible pilot parachute having a flexible connection thereto, a container for the main parachute having closing means, a rip cord connected to and for ripping said closing means to release the main parachute, and time controlled mechanism connected to said rip cord and releasably connected to the pilot parachute and governed to cause it to open said closing means to release the main parachute as soon as the pilot parachute is expanded in descending aerially and at the elapsing of a previously determined time.

2. In combination, a collapsible main parachute and a collapsible pilot parachute having a flexible connection thereto, a container for the main parachute having openable closing means, a cord connected to and for opening said closing means to release the main parachute, a timer, and releasably lockable resiliently reactively controlled means connected to said cord, and associated with said timer for starting said means and adapted to cause it to open said closing means to release the pilot parachute, then to release the main parachute at a determined time after the pilot parachute has expanded in descending.

3. In combination, a collapsible main parachute and a collapsible pilot parachute having a flexible connection thereto, a container for the main parachute having openable closing means, a cord connected to and for opening said closing means to release the main parachute, and flexibly releasably connected to said pilot parachute, and resiliently reactively controlled releasably locked mechanism connected to said cord and adapted to cause it to be unlocked to operate to tension said cord to cause it to open said closing means to release the main parachute at a determined time after the pilot parachute has expanded in its descent.

4. In combination, a collapsible main parachute and a collapsible pilot parachute having a flexible connection thereto, a container for the main parachute having openable closing means, a cord connected to and for opening said closing means to release the main parachute, means connected to said cord adapted to cause it to open said closing means at a predetermined time, a timer and linking means separably connected between said pilot parachute and said cord operating means to start the timer, and to be separated from the opening means when the pilot parachute is expanded in descending with the released main parachute.

5. In combination, a collapsible main parachute and a collapsible pilot parachute having a flexible connection thereto, a container for the main parachute having openable closing means, a cord connected to and for opening said closing means to release the main parachute, mechanism connected to said cord adapted to cause it to open said closing means at a desired predetermined time, and linking means separably connected between the pilot parachute and said mechanism, comprising a swingable open hook device connected to said mechanism and having a pair of spaced cam terminals to in turn engage compressingly a resilient body associated with said mechanism to hold releasably the hook device in either an open or a closed position relative to the mechanism, and a flexible connection to said pilot parachute having engaging means terminally thereon to releasably interlock with said hook device, and to cause the latter to swing to release the said engaging means when the pilot parachute expands in descending and exerts traction by means of the engaging means upon and to swing open the hook device, a timer, the hook device having a projection adapted to move an element of the timer associated with said mechanism to start the timer by action of the flexible connection to the pilot parachute when under strain caused by the expansion of the latter after launching, and the timer having another element operative at the expiration of a predetermined time interval after a launching to act upon the releasing mechanism for the main parachute to release the mechanism for operation in opening the container for separation of the main parachute therefrom.

JAMES V. MOHLER.